United States Patent
Kumar et al.

(10) Patent No.: US 11,861,395 B2
(45) Date of Patent: Jan. 2, 2024

(54) METHOD AND SYSTEM FOR MANAGING MEMORY FOR APPLICATIONS IN A COMPUTING SYSTEM

(71) Applicant: Samsung Electronics Co., Ltd., Suwon-si (KR)

(72) Inventors: Ganji Manoj Kumar, Bengaluru (IN); Jaitirth Anthony Jacob, Bengaluru (IN); Rishabh Raj, Bengaluru (IN); Vaisakh Punnekkattu Chirayil Sudheesh Babu, Bengaluru (IN); Renju Chirakarotu Nair, Bengaluru (IN); Hakryoul Kim, Suwon-si (KR); Shweta Ratanpura, Bengaluru (IN); Tarun Gopalakrishnan, Bengaluru (IN); Sriram Shashank, Bengaluru (IN); Raju Suresh Dixit, Bengaluru (IN); Youngjoo Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 359 days.

(21) Appl. No.: 17/169,400

(22) Filed: Feb. 5, 2021

(65) Prior Publication Data

US 2022/0188145 A1 Jun. 16, 2022

(30) Foreign Application Priority Data

Dec. 11, 2020 (IN) .............................. 202041053998

(51) Int. Cl.
*G06F 9/48* (2006.01)
*G06F 9/50* (2006.01)
*G06N 20/00* (2019.01)

(52) U.S. Cl.
CPC .......... *G06F 9/4856* (2013.01); *G06F 9/5016* (2013.01); *G06F 9/5088* (2013.01); *G06N 20/00* (2019.01); *G06F 2209/508* (2013.01)

(58) Field of Classification Search
CPC .... G06F 9/4856; G06F 9/5016; G06F 9/5088; G06F 2209/508; G06F 2212/1024; G06F 9/4881; G06F 12/04; G06N 20/00
See application file for complete search history.

(56) References Cited

U.S. PATENT DOCUMENTS

| | | | |
|---|---|---|---|
| 6,877,081 B2 | 4/2005 | Herger et al. | |
| 7,380,089 B2 | 5/2008 | Herger et al. | |

(Continued)

FOREIGN PATENT DOCUMENTS

| | | | |
|---|---|---|---|
| EP | 3674846 | * | 10/2017 |
| KR | 10-0488851 B1 | | 5/2005 |

(Continued)

OTHER PUBLICATIONS

Intellectual Property India, "Examination report under sections 12&13 of the Patents Act," dated Jul. 4, 2022, in connection with Indian Patent Application No. 202041053998, 7 pages.

(Continued)

*Primary Examiner* — Sisley N Kim

(57) ABSTRACT

A method for managing memory for applications in a computing system includes receiving a selection of a preferred application. During user-controlled operation over the application, the transitions of selected application between foreground and background are monitored. A retention of the application in memory is triggered upon a transition of the application to background during the user operation. Retention of the application includes compressing memory portions of the application. Accordingly, the application is retained within the memory based on said compressed memory portions. A requirement to restore the retained (Continued)

application is sensed based on either a user selection or an automatically generated prediction and the application is restored from the retained state back to the foreground.

20 Claims, 13 Drawing Sheets

(56) References Cited

U.S. PATENT DOCUMENTS

| | | |
|---|---|---|
| 7,844,793 B2 | 11/2010 | Herger et al. |
| 8,880,862 B2 | 11/2014 | Fallon et al. |
| 9,308,452 B2 | 4/2016 | Perlman et al. |
| 9,690,748 B1 * | 6/2017 | Roy ................... G06F 16/957 |
| 10,133,601 B2 | 11/2018 | Apparao et al. |
| 10,552,179 B2 | 2/2020 | Myrick et al. |
| 10,552,320 B2 | 2/2020 | Zhou et al. |
| 10,606,367 B2 | 3/2020 | Wisnia et al. |
| 10,754,567 B2 | 8/2020 | Myrick et al. |
| 11,132,219 B2 | 9/2021 | Chen et al. |
| 2002/0161932 A1 | 10/2002 | Herger et al. |
| 2005/0198460 A1 | 9/2005 | Herger et al. |
| 2008/0263292 A1 | 10/2008 | Herger et al. |
| 2015/0242432 A1 | 8/2015 | Bak et al. |
| 2016/0335265 A1 | 11/2016 | Park et al. |
| 2019/0179662 A1 | 6/2019 | Chen et al. |
| 2019/0347113 A1 | 11/2019 | Ma et al. |
| 2019/0370009 A1 | 12/2019 | Venkatraman et al. |
| 2020/0241917 A1 * | 7/2020 | Chen ................... G06F 18/2113 |
| 2021/0142179 A1 | 5/2021 | Chen et al. |
| 2021/0406062 A1 | 12/2021 | Chen et al. |

FOREIGN PATENT DOCUMENTS

| | | |
|---|---|---|
| KR | 10-2021-0055582 A | 5/2021 |
| KR | 10-2313882 B1 | 10/2021 |
| WO | 2019/238124 A1 | 12/2019 |
| WO | 2020/139048 A1 | 7/2020 |

OTHER PUBLICATIONS

International Search Report dated Sep. 3, 2021 in connection with International Patent Application No. PCT/KR2021/001768, 4 pages.
Written Opinion of the International Searching Authority dated Sep. 3, 2021 in connection with International Patent Application No. PCT/KR2021/001768, 5 pages.

* cited by examiner

METHOD AND SYSTEM FOR MANAGING MEMORY FOR APPLICATIONS IN A COMPUTING SYSTEM

CROSS-REFERENCE TO RELATED APPLICATION

This application is based on and claims priority under 35 U.S.C. § 119(a) to Indian Patent Application No. 202041053998 filed on Dec. 11, 2020 in Intellectual Property India, the disclosure of which is incorporated by reference herein in its entirety.

BACKGROUND

1. Field

The present invention relates to computing-systems and in particular, the invention relates to method and system for memory management.

2. Description of Related Art

Memory devices offer more flexibility in keeping more applications in the primary memory (RAM) of a computing device, such as a smartphone. However, with prolonged usage and the presence of more of memory intensive applications, applications may get killed by operating system, thereby resulting in cold or subdued launches. In one example, for certain resource-intensive gaming applications, this cold launch timing will be in the order of 20 s~40 s, causing irritation to user.

As an example, a user finishes a favorite game. The user then presses the home button and switches to another app which may remove the game from memory. A few hours later, the user activates the game application. In some cases, to re-launch the game from a splash screen, can take as long as 34 seconds, which, from a user experience perspective, can be highly undesirable.

Certain memory management techniques turn off a user's preferred application in order to maintain the memory available for other applications. Turning off preferred applications can negatively impact user experience by causing a prolonged wait to load memory-intensive applications (such as games). The aforementioned problems of prolonged load time can be especially is more frequent and severe in power-efficient Low Memory devices.

In view of the above, achieving memory-management for multiple user preferred applications at significantly reduced memory cost and minimizing long load times remains a source of technical challenges and opportunities for improvement in the art.

SUMMARY

This summary is provided to introduce a selection of concepts in a simplified format that is further described in the detailed description of the invention. This summary is not intended to identify key or essential inventive concepts of the claimed subject matter, nor is it intended for determining the scope of the claimed subject matter.

Certain embodiments according to the present disclosure include a method for managing memory for applications in a computing system. The method comprises receiving a selection of a preferred-application with respect to a user. During a user operation over the application, the transitions of selected application between foreground and background are monitored. A retention of the application in memory is triggered upon the transition of the application to background during the user operation. The retention comprises compressing memory portions of said application and thereby freeing memory occupied by said application at foreground during the user operation. Accordingly, the application is retained within the memory based on said compressed memory portions with respect to the application. Thereafter, a requirement of restoring the retained application is sensed based on either a user selection or an automatically done prediction. Based on said sensing, the application is restored from the retained state back to the foreground. The restoration comprises decompressing the compressed portions of the application in the memory to enable occupation of additional space in the memory by the application. Accordingly, the user operation is allowed again over the application.

To further clarify the advantages and features of certain embodiments according to the present disclosure, a more particular description of the invention will be rendered by reference to specific embodiments thereof, which is illustrated in the appended drawings. It is appreciated that these drawings depict only illustrative embodiments according to this disclosure and are therefore not to be construed as limiting of the scope of this disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Figure 1:
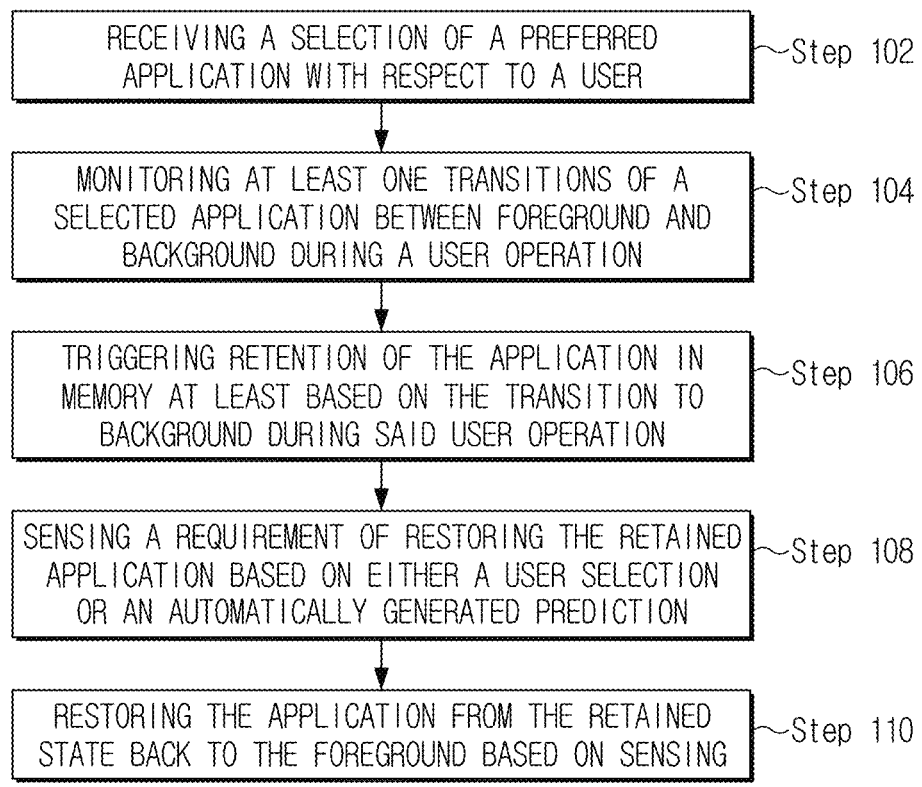
FIG. 1 illustrates operations of an example method according to various embodiments of this disclosure.

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

DETAILED DESCRIPTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

For the purpose of explaining the present disclosure, reference will now be made to the examples illustrated in the drawings and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates.

It will be understood by those skilled in the art that the foregoing general description and the following detailed description are explanatory of the present disclosure and are not intended to be restrictive thereof.

Reference throughout this specification to "an aspect", "another aspect" or similar language means that a particular feature, structure, or characteristic described in connection with the embodiment is included in at least one embodiment of the present disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skilled in the art to which this disclosure belongs. The system, methods, and examples provided herein are illustrative only and not intended to be limiting.

FIG. 1 illustrates an example of a method for managing memory for applications in a computing system according to various embodiments of this disclosure. The method comprises receiving (Step 102) a selection of a preferred application with respect to a user. In certain embodiments receiving of the selection of the preferred application comprises receiving a selection done by user in a user-interface. In some embodiments, the selection may be a machine learning (ML) model driven selection based on its learning of user's application usage behaviour.

Referring to the non-limiting example of FIG. 1, a method according to some embodiments further comprises monitoring (step 104) at least a transition of selected application between foreground and background during a user operation. The monitoring of the application upon having been selected as the preferred application comprises monitoring one or more of memory consumption, or the types of content allocated across memory regions of the computing system.

The method further comprises triggering (step 106) retention of the application in memory, wherein the triggering is based on, at a minimum, a transition of the preferred application to the background in response to the user operation received at step 102. According to some embodiments, the retention comprises compressing memory portions of said application and thereby freeing memory occupied by said application at foreground during the user operation. The compression may be defined as compressing memory portions of the application in a dedicated data store by a compression method based on characteristics of the data in memory, and maintaining one or more computing processes supported the selected application as active to retain the application in the compressed state. Thereafter, application is retained based on said compressed memory portions. The storage of the compressed portion of the application comprises storing at least portions of the application in either a primary memory or a secondary memory based on one or more of primary memory and secondary storage utilization, performance, load and I/O operations associated with the device.

In certain embodiments, at operation 106 the triggering of retention of the application comprises initiating compression based on using a timeout upon the application transiting into the background, said timeout being a static timeout or a decaying timeout dynamically decided by a machine learning model based on the application usage pattern.

Referring to the illustrative example of FIG. 1, at step 108, a requirement of restoring the retained application is sensed based on either a user selection or an automatically done prediction. The sensing comprises one or more of automatically predicting a likelihood of launch of the retained application, and initiating decompression of the retained application at a time prior to predicted launch time, thereby minimizing the likelihood of a computing overload during launch of the retained application. According to certain embodiments, automatically generating the prediction as to when restoring a retained application is to occur comprises predicting the likelihood of a launch of the retained application by the machine learning model based on the user behaviour.

According to various embodiments, at step 110, the application is restored from the retained state back to the foreground based on sensing that restoration of the application is required. in some embodiments, the restoration comprises decompressing the compressed portions of the application in the memory to enable occupation of additional space in the memory by the application. Further, the method comprises allowing the user operation again over the application.

While not shown in the example of FIG. 1, according to some embodiments, may receive a command or other input for deselection of a preferred application as a preferred application. In certain embodiments, a deselected application is not retained in a compressed state in response to certain user inputs, such as minimizing, or moving the application to the background. In this way, deselection can free up memory and related resources otherwise employed for retaining a preferred application.

While the example of FIG. 1 has been described with reference to gaming-applications, embodiments according to the present disclosure are not limited thereto.

Figure 2A:
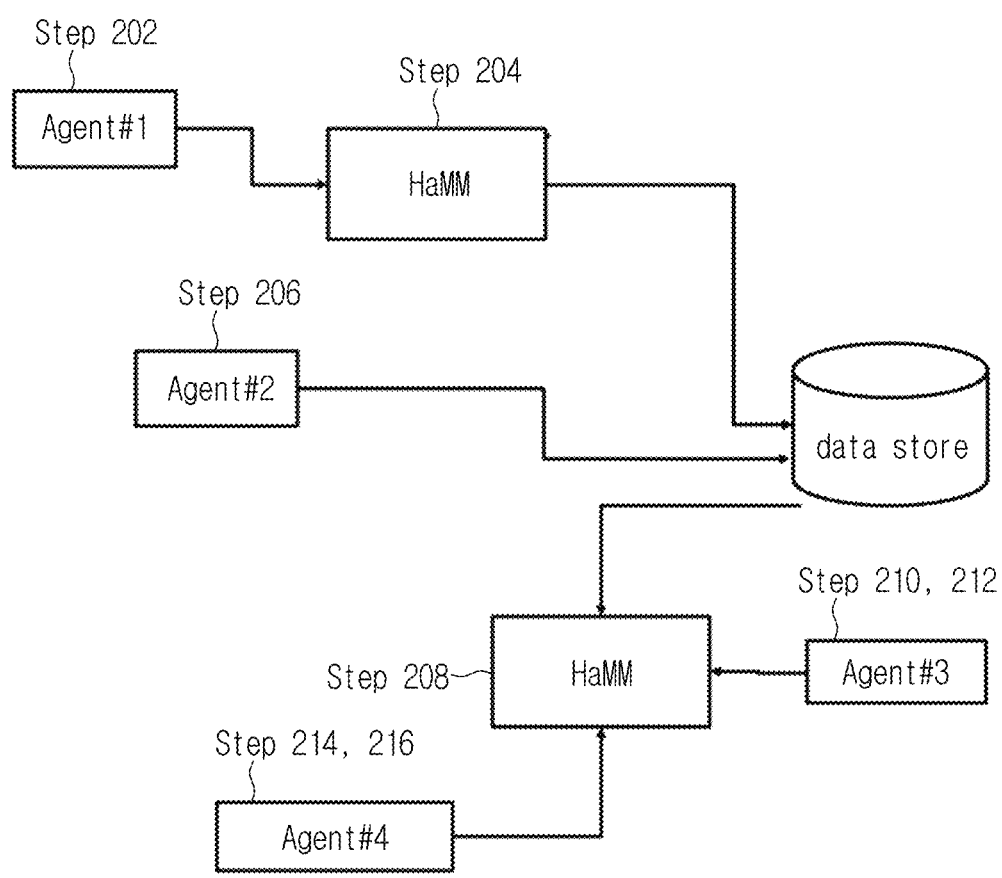
FIGS. 2A and 2B illustrate an example of a system architecture according to various embodiments of this disclosure.

FIG. 2a illustrates an example of a method for retaining a user preferred resource-intensive (also known as a "heavy" application) application in a smartphone according to certain embodiments of this disclosure.

Referring to the illustrative example of FIG. 2A, at step 202, a first agent executing on a smartphone allows selection of application preferred to user. This selected app is registered to a proposed module, which is a Heavy-app Memory Management unit (HAMM). The first agent may be a game, or a state of the art game—There is no such as game booster/game-launcher. In addition, the first agent may be AI that automatically generates a recommendation for selection of application as preferred application. According to various embodiments, the actions of the first agent at step 202 correspond to step 102.

The first agent which performs selection of application may either resort to a selection done by user in a UI or a learning agent which may select automatically on user behaviour based on its learning of user's application usage behaviour.

At step 204, after an application is registered with HAMM, the HAMM starts monitoring transitions of the selected application, including, without limitation, switching between running the application in the foreground and running the application in the background. Additionally, the monitored-characteristics of the selected-applications such as memory-consumption, type of content across its allocated memory regions (allocation, file, I/O, etc.).

At step 206, when the registered app is sent to background by user interaction, a second agent is activated. This agent is responsible for implementing decision logic governing retaining of the app. According to various embodiments, the operations undertaking at steps 204 and 206 correspond to step 104 of FIG. 1. In certain embodiments, the second agent performs the initiation of compression may be using a timeout after initiation of background switch event of the app. This time out may be a static or based on a decaying value depending of selected applications usage pattern.

At step 208, on switching to background, the second agent informs proposed module to initiate compression of memory regions of selected application.

As shown in the illustrative example of FIG. 2A, at step 210, the proposed module compresses memory of the application which is later stored in a dedicated data store, and the original memory earlier occupied by the application is freed, thereby making more memory available for entire system. Meanwhile, the process backing the selected application is kept alive. Furthermore, the choice of compression method to be used is identified based on the characteristics of the data in memory for the app. In certain embodiments, steps 208 and 210 correspond to step 106 of FIG. 1.

The data store used by proposed module for storing a compressed application may be provided through at least one of primary memory or secondary memory. The decision to select the primary or secondary memory as the data store for storing the compressed application may be based on one or more of primary memory and secondary storage utilization, performance & load on I/O operations on memory or storage available in the device.

Referring to the illustrative example of FIG. 2a, at step 212, a third agent informs the HAMM to perform decompression of the already compressed data to its original form. This third agent identifies when the selected app is likely to be launched, hence achieving a proactive decompression ahead of launch, thereby reducing any performance overhead associated with decompressing the application postponing launch of the application. The third agent which initiates the trigger of so called proactive decompression, may be a UI agent when opened sends the event trigger, or it may be an AI agent which may predict the likelihood of immediate launch of retained, compressed application.

At step 214, the cycle of compression and decompression is managed together by second and third agents, until the application is selected to be deregistered from the proposed module by a fourth agent. In the example of FIG. 2a, steps 212 and 214 may correspond to steps 108 and 110 of FIG. 1.

According to various embodiments, at step 216, once the fourth agent selects and informs the proposed module that a managed application is to be deregistered, it will free up the compressed memory and related resources to retain the app. After which the app may get removed depending on system state and other applications getting used by user in due time.

The fourth agent may make use of a static or decaying timeout to decide on deregistration of application from proposed module. In some embodiments, the fourth agent may make use of an AI agent which predicts the relevance of an application to the user based on behaviour of usage. As one non-limiting example, a determination that an application is to be deregistered is performed when an application's relevance drops below a certain threshold. In certain embodiments, the first and fourth agents may consider low memory indicators in a device as factors in the control logic for compression and deregistration.

Figure 2B:
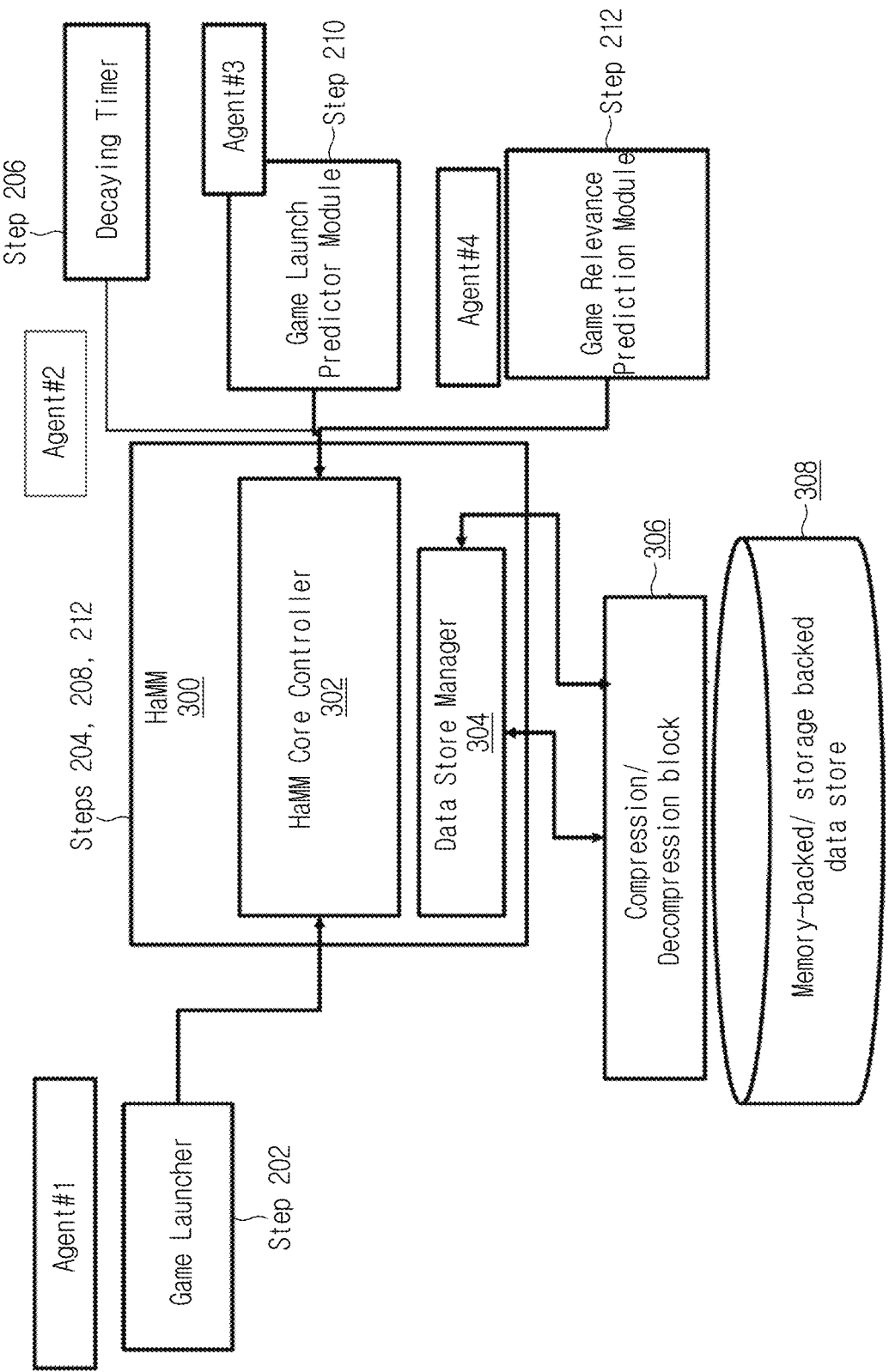

FIG. 2b illustrates an example of a computing architecture for implementing methods according to this disclosure (for example, for implementing steps 202-216 of FIG. 2a). According to various embodiments, HAMM 300 may be configured to execute the steps of 204, 208 and 212. Similarly, in some embodiments, Agent 1, Agent 2, Agent 3 and Agent 4 are respectively configured to execute the steps 202, 206, 210 and 212 described with reference to FIG. 2a.

According to various embodiments, the HAMM 300 for executing the steps 204, 208 and 212 comprises a controller 302 and a memory manager 304. In addition, the memory manager 304 comprises a compression-decompression block 306 and a data store 308 (memory based and storage based).

Figure 3:
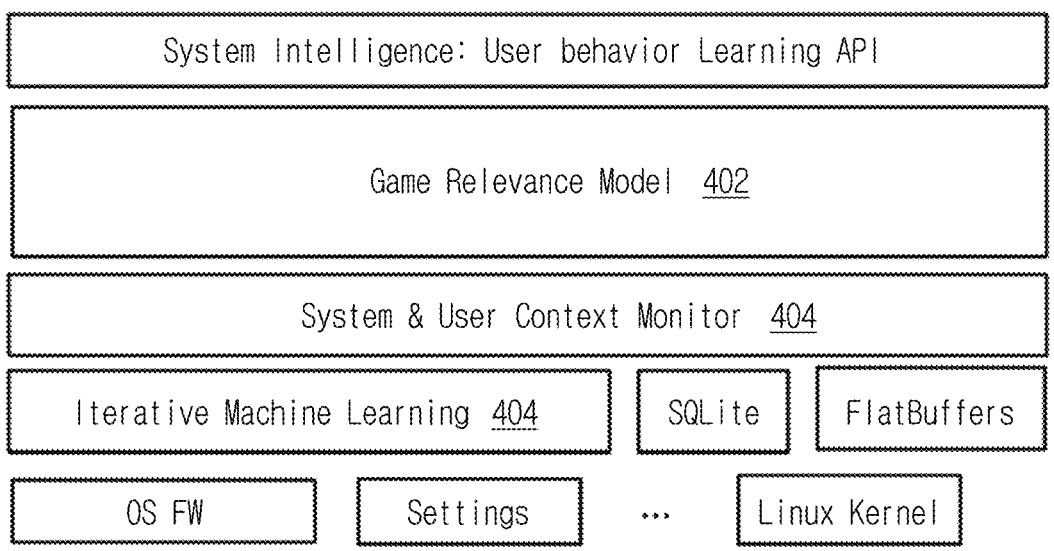
FIG. 3 illustrates an example of a networking environment, according to some embodiments of the present disclosure.

FIG. 3 illustrates an example of an on-device Machine Learning (ML) system 400 hosting a plurality of system-learning models for rendering data-management for ML models according to certain embodiments of this disclosure.

According to some embodiments ML system 400 utilizes OnDevice Iterative Machine Learning technique such as Multi-Stochastic Gradient Descent Regression.

In some embodiments, ML system 400 may be used to predict and identifying games or other applications that are relevant, and thus, likely to be launched by a given user at a given time. According to some embodiments, the predictions as to which applications will be of immediate relevance user are pushed to the user as notifications, so that she may provide user inputs to select the identified applications for retention in memory.

Furthermore, knowledge of relevance of a game (or other application) enables a game controller to identify whether to retain the game or not via compression or recalculate the relevance of the game (or other application) and release memory resources which would otherwise be committed to the game's retention.

Figure 4:
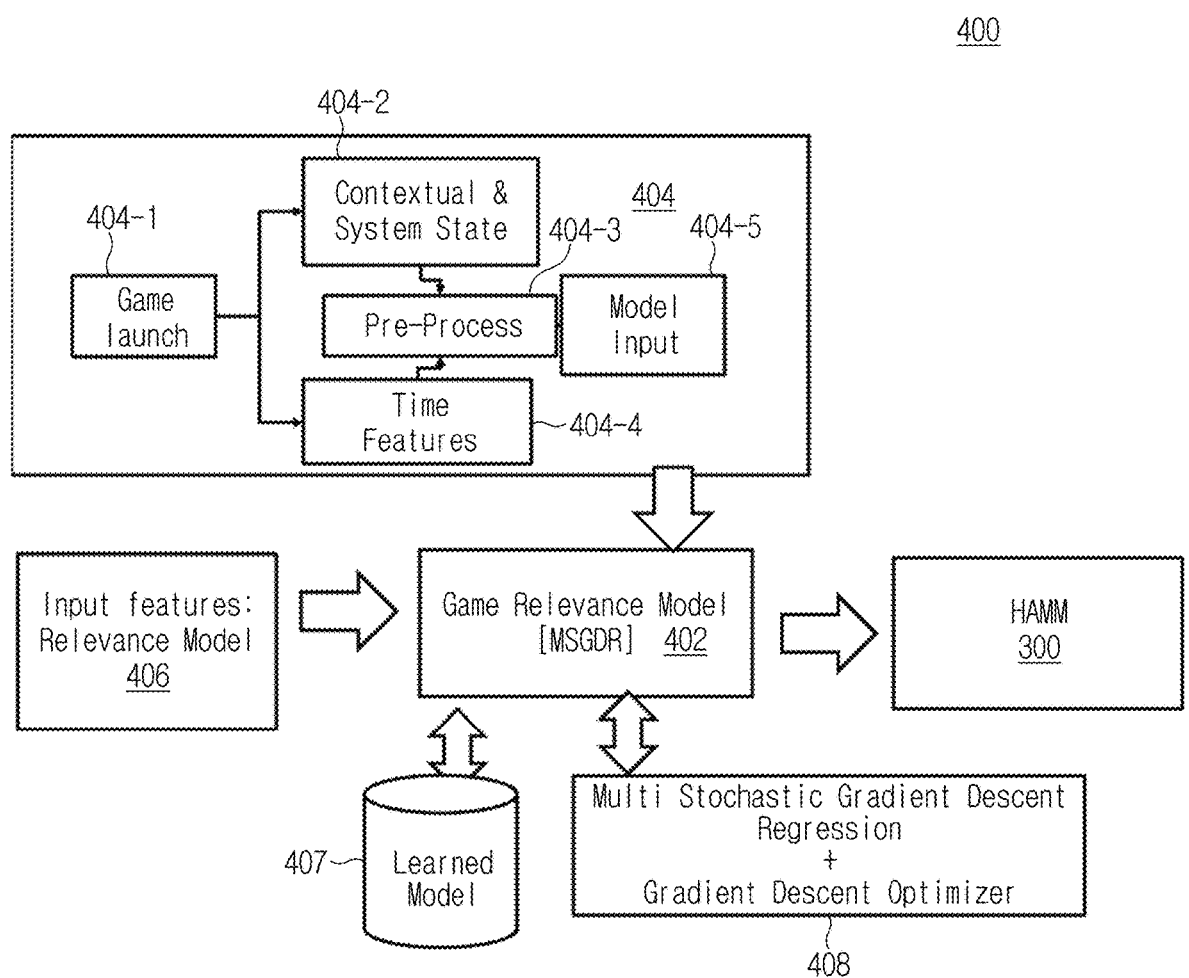
FIG. 4 illustrates an example of an implementation of a method accordance according to certain embodiments of this disclosure.

FIG. 4 illustrates an example of learning a user's behaviour through the ML system 400 to predict which applications will be utilized according to various embodiments. More specifically, the user and system context data 404 is derived for model-training for training the ML system 400.

Referring to the non-limiting example of FIG. 4, user and system context data 404 comprises battery level, Wi-Fi state, Airplane mode status, Data pack, Activity status, charging status, recently-used applications, and screen orientation. According to various embodiments, user and system data 494 further comprises time features, which can include day, month, week, time of the data. Yet another input may be the identifiers allocated to the application. In addition, the user and system context data 404 may include Game Launch 404-1, Contextual & System State 404-2, Pre-Process 404-3, Time Features 404-4, Model Input 404-5.

The ML system 400 may be based on an iterative machine-learning principle which may be, for example, a combination of a multi-stochastic gradient descent regression and a gradient descent optimizer. In addition, a game relevance model 402 may output HAMM 300 based on input features (relevance model 406), the user and system context data 404, Leaned Model 407, the multi-stochastic gradient descent regression and a gradient descent optimizer 408.

In certain embodiments, the game (or other type of application) relevance model 402 forming a part of the ML system 400 comprises one or more of the Agent 1, Agent 2 and Agent 3 and may categorize the application under the following headings:
a) Relevant Game for the user for selection (entry), which may be sub-classified as High Chance of Entry, Low chance of entry.
b) Eviction (High, Medium, Low). The same may be sub-classified as:
EntryHigh—High Chance of Entry
ExitHigh—Low usage, High probability to remove
ExitMedium—Medium usage, Medium probability to remove.
ExitLow—Low usage, User may use the game one or 2 times in a week.

Figure 5:
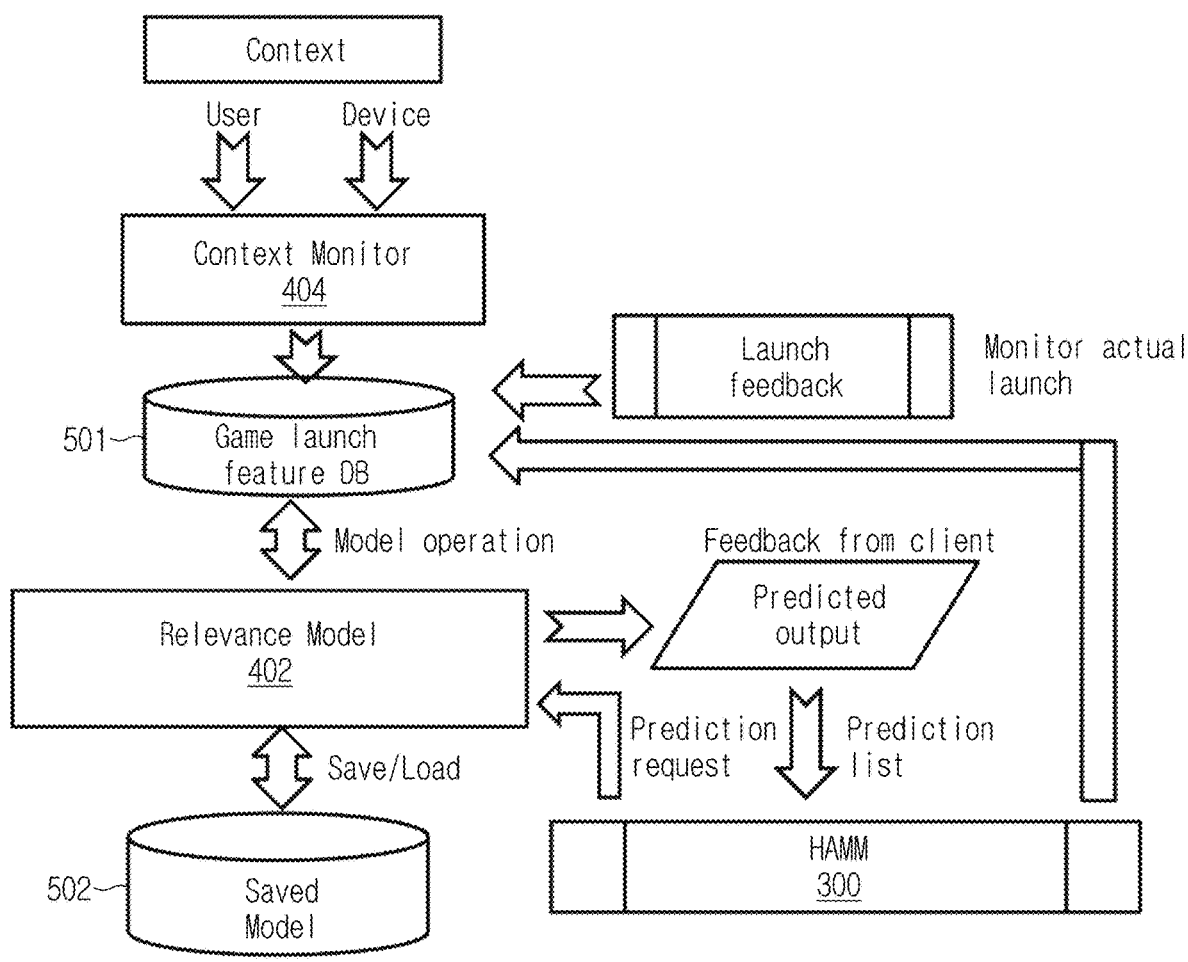
FIG. 5 illustrates an example of an artificial intelligence (AI) module for certain methods according to some embodiments of the present disclosure.

FIG. 5 illustrates an example of retraining of the ML system 400 with respect to user-behaviour and modelling user behaviour, according to various embodiments of this disclosure.

As mentioned before, the relevance model 402 appropriates iterative machine learning criteria such as Multi-Stochastic Gradient Descent Regression criteria. As a part of retraining, the ML system 400 personalizes the game relevance model 402 based on a user profile.

According to certain embodiments, training data is fed as a feature map with respect to the user performed application's launches as done under various contexts. Such training data comprising the user based data and the contextual-data has been referred in FIG. 4 as a part of input data. In addition, as a part of retraining, this training-data has also historical data such as past done predicted output by the relevance model 402 and historical launches of the application as done by the user. In addition, the relevance model 402 may output the predicted output based on a Game Launch feature DB 501, a Saved Model 502.

Figure 6:
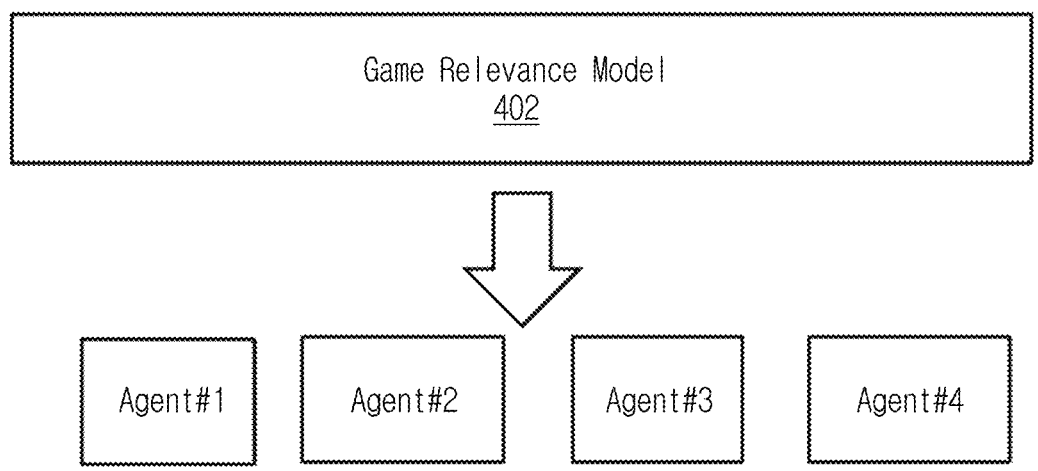
FIG. 6 illustrates an example of aspects of training an AI module, according to various embodiments of this disclosure.

FIG. 6 illustrates aspects of the control logic implemented by a game relevance module (for example, the trained and retrained game relevance module 402 in FIG. 5) according to various embodiments of this disclosure.

Referring to the illustrative example of FIG. 6, in this example Agent 2, is responsible for selecting game for retaining at step 206, the relevance model 402 predicts relevance and automatically compresses the game for retaining.

In the non-limiting example of FIG. 6, Agent 3 triggers proactive decompression with respect to step 210, the relevance model 402 predicts a high chance of a specific game (or other type of application) to be launched within a predetermined time frame (for example, in the next 15 minutes).

With respect to Agent 4, that triggers proactive decompression with respect to step 212, the relevance model 402 predicts low chance of game to be launched for next "x" hours and accordingly evicts the game from being retained.

Figure 7:
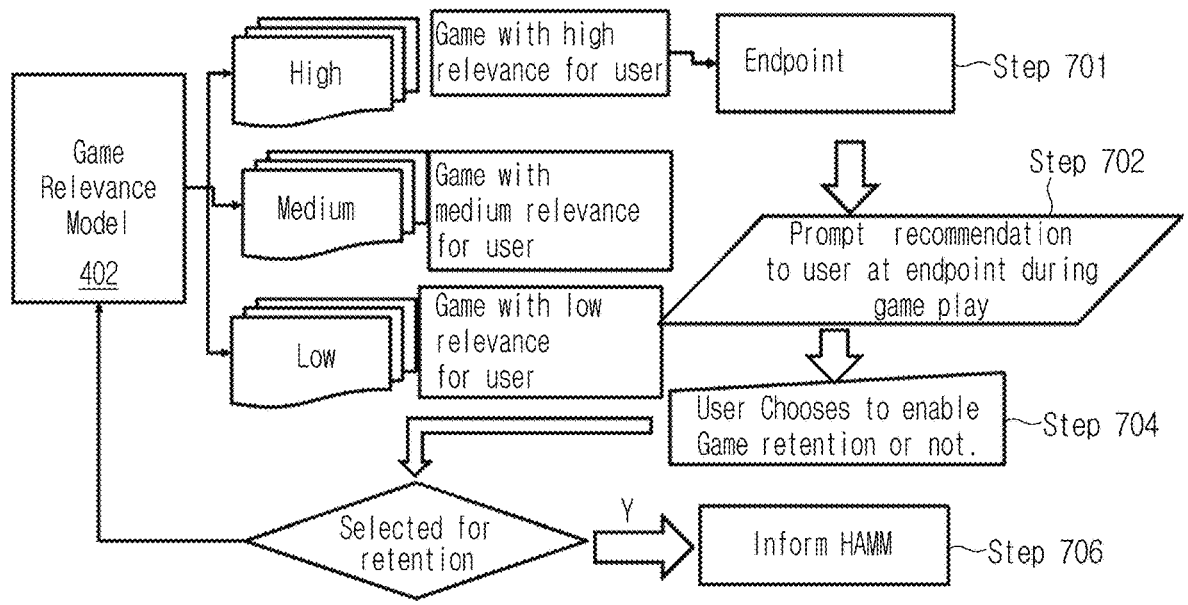
FIG. 7 illustrates an example of an implementation of a method according to certain embodiments of this disclosure.

FIG. 7 illustrates an example of a decision flow from a game relevance model (for example, relevance model 402 in FIG. 5) to an agent (for example, Agent 1 described with reference to step 202 in FIG. 2a) at an initial stages of operation of a method according to certain embodiments (for example, step 202 in FIG. 2*a*). More specifically, in the illustrative example of FIG. 7 user-behaviour learning is used to recommend a game for retaining by a user during the initial stage of operation.

As depicted in the illustrative examples of FIG. 4 and FIG. 5, in certain embodiments relevance model 402 learns user behaviour, predicts the user's probable application usage behaviour and groups games (and potentially other types of applications) into relevance-groups. Games in high relevance groups are determined to have a high probability of launched by a user and games in low relevance groups are determined to have a lower probability of being launched.

Accordingly, at step 701 and step 702, a recommendation from HIGH relevance games is received.

At step 704, subsequent to a game from a HIGH relevance list being opened, and a user being prompted for consent on retaining the game, an input corresponding whether the user consents to enable game retention is received. In certain embodiments, the user's input on whether to enable game retention is also sent as feedback to the relevance model to personalize further. As may be understood, the user may also override the recommendation and manually choose a game of his choice for retention.

At step 706, if the user chooses Y in step 704, a request is sent to add the game in the list of games for retention and the selection Y of step 704 is informed to HAMM.

Based on the same analogy, a decompression operation of a game in Compressed Data Store (CDS) is triggered when either the user launches a game reactively and when an agent decides to do it proactively.

Figure 8:
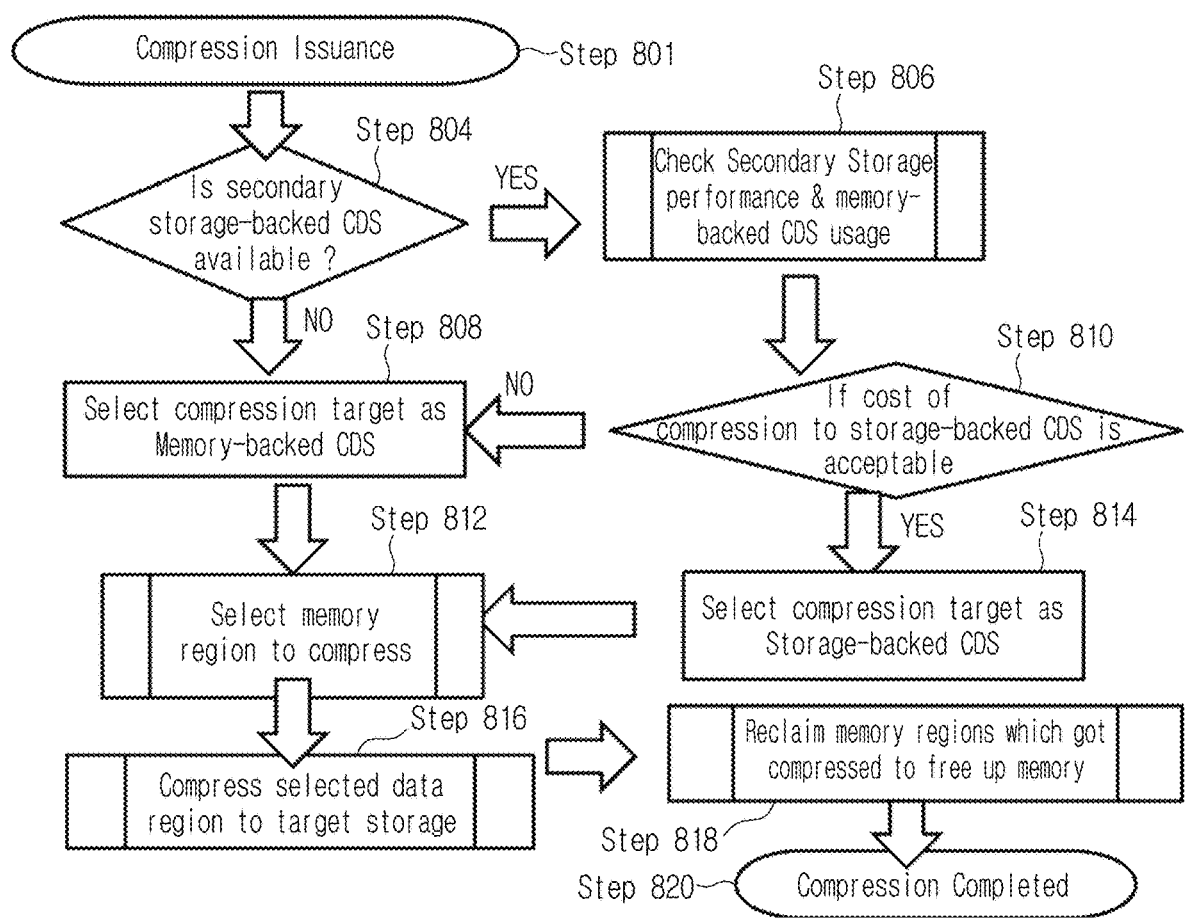
FIG. 8 illustrates an example of an implementation of a method according to various embodiments of this disclosure.

FIG. 8 illustrates an example of operations of a compression operation associated with retaining an application in memory according to various embodiments of this disclosure.

Referring to the non-limiting example of step 801, a compression operation may be triggered by Agent 2 immediately based on application switching to the background or a decaying timeout. In some embodiments, a decaying timeout may be dynamically calculated by the ML system of the device. The selection of the game (or other type of application) for such compression may be previously performed by Agent 1, and may be based on a manual selection by a user or an AI enabled operation through Relevance model 402. In one example, the compression operation may be triggered by a gaming aggregation system such as a Game booster or Game Launcher.

In certain embodiments, upon triggering the compression operation step 801, available memory resources are checked through steps 804, 806 and 810 to determine a need to utilize external storage for the compression operation. According to various embodiments, at step 804, a determination is performed as to whether secondary storage backed CDS is available. If secondary storage backed CDS is available, operation proceeds to step 806, where a check of secondary storage performance and memory-backed CDS usage is performed. According to various embodiments, at step 810, a determination of whether the cost of compression to a storage-backed CDS is acceptable. If the cost of storage backed CDS is unacceptable, operation proceeds to step 808, where memory backed CDS is selected as a compression target. As shown in the illustrative example of FIG. 8, at step 814 storage-backed CDS is selected as the compression target, and both branches from step 804 reunite at step 812, where a memory region for the compressed application is selected. In certain embodiments, at step 816, the application is compressed and sent to the selected data region. At step 818, memory regions previously holding uncompressed application data are reclaimed, thereby freeing up memory, and the method terminates at step 820.

Figure 9:
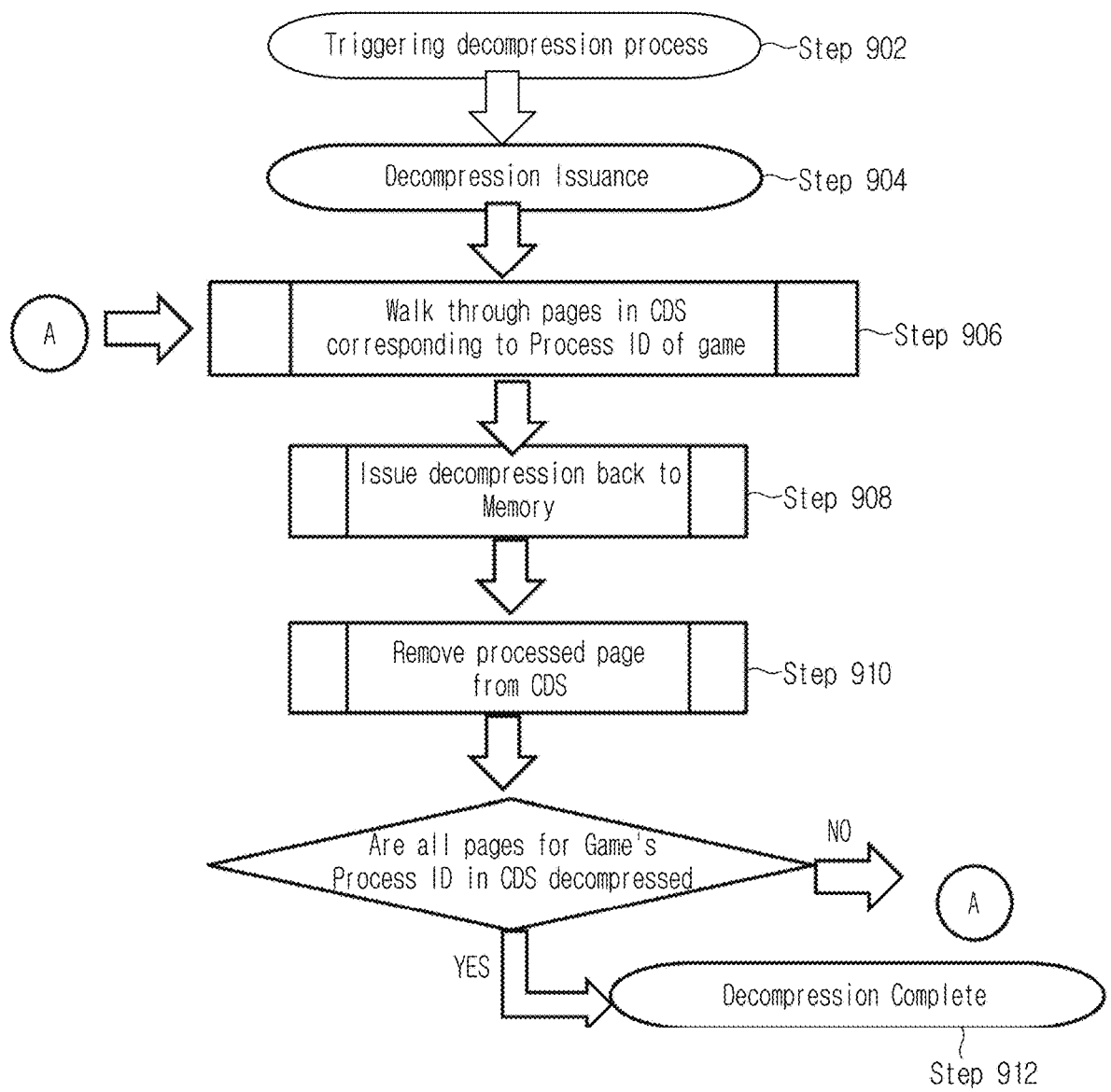
FIG. 9 illustrates another example-implementation of method steps of FIG. 1, in accordance with the embodiment of the invention.

FIG. 9 illustrates an example of decompression operation according to various embodiments of the present disclosure. Referring to the non-limiting example of FIG. 9, at operation 904 a decompression operation of a game in Compressed Data Store (CDS) is triggered when a user launches a game in a reactive manner (e.g. an user input for starting the game or an user input in response to a displayed screen). In certain embodiments, the relevance module 402 acting as Agent 2 issues a trigger for HAMM 300 proactively (even in absence of user launching the game) and issues an instruction to decompress the game in advance of an expected launch time for the game (or other application), such as, 15 minutes before an expected launch of the game.

Step 902 refers triggering the decompression process and refers analysis of compressed portions or compressed-pages of the application. Step 904 refers issuance of the decompression command. Step 906 refers to walking through pages in CDS corresponding to the Process ID of a game. Step 908 refers to issuing a decompression instruction to memory. Step 910 refers removal of processed pages created due to compression. Step 912 represents completion of the decompression operation.

The following table (Table 1) illustrates performance benefits created by proactive decompression of retained applications by relevance models according to various embodiments of this disclosure.

TABLE 1

| | Warm Launch Timing (Ms) | | | |
|---|---|---|---|---|
| App | Base | Warm launch (No proactive decompression) | Warm launch with Proactive decompression | Benefit % |
| Game 1 | 207.4 | 242.2 | 190 | 21.55 |
| Game 2 | 425 | 533.6 | 418.8 | 21.51 |
| Game 3 | 411 | 575 | 464.8 | 19.17 |
| Game 4 | 513.2 | 616 | 514.4 | 16.49 |

Figure 10A:
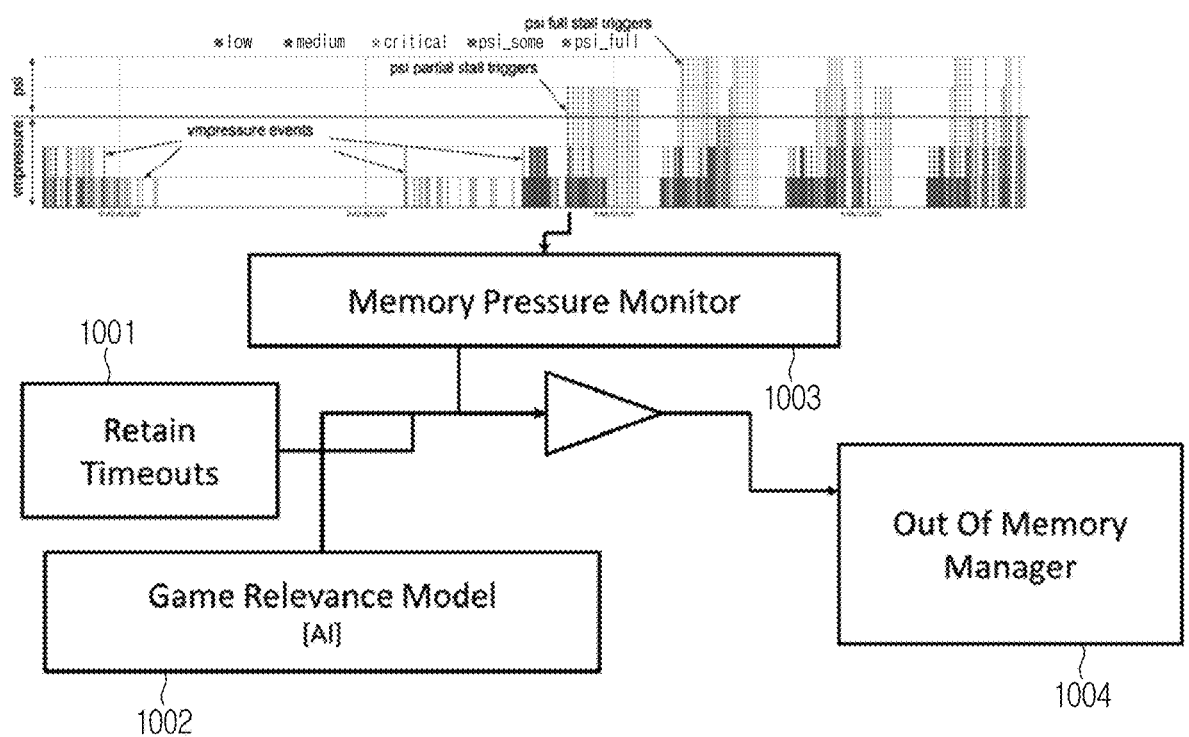
FIGS. 10A and 10B illustrate an example of an implementation of a method according to various embodiments of this disclosure.
Figure 10B:
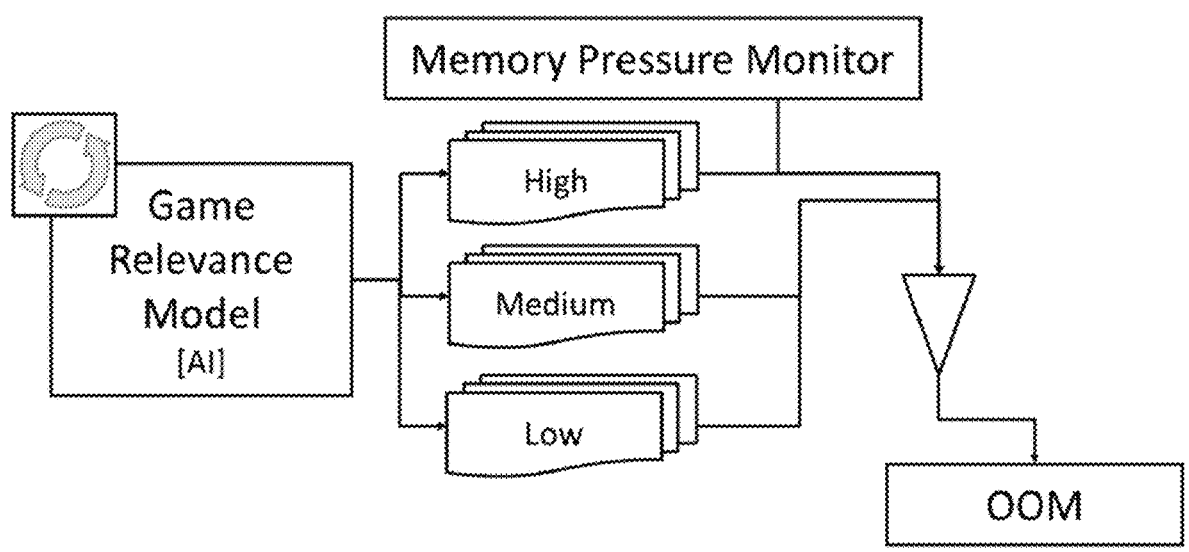

FIGS. 10A and 10B illustrate an example of application of a game relevance model according to various embodiments of this disclosure to low RAM slot management.

Referring to the illustrative example of FIG. 10A, an Out of Memory (OOM) score for an application is set to foreground visible. The out of memory (OOM) score adjustment is based on, without limitation, game retention timeouts (or retain timeouts, 1001) & relevance (Game relevance model 1002). In this example, a trend of memory Pressure increase and threshold levels due to compression/retention/eviction of applications may be used for updating OOM score. In another example, the likelihood of Memory increase may be learnt from the relevance model and OOM score is adjusted accordingly. In addition, Out of Memory Manager 1004 may obtain the OOM score based on the retain timeouts 1001, the Game relevance model 1002, memory pressure monitor 1003.

Referring to the illustrative example of FIG. 10B, an example of multi-endpoint slot management is described in the application. The example shown in FIG. 10B may be specific for devices with multiple endpoints such as Game Launcher, Game Booster & Never Kill App. Accordingly, the Out of Memory (OOM) score management may be based on relevance model & memory pressure build up. The OOM Score may be updated for processes in packages which are not likely to be used as memory pressure is building.

In an example, based on FIG. 10A and FIG. 10B, updating of an OOM score may be contemplated instead of evicting the application from being retained.

Figure 11:
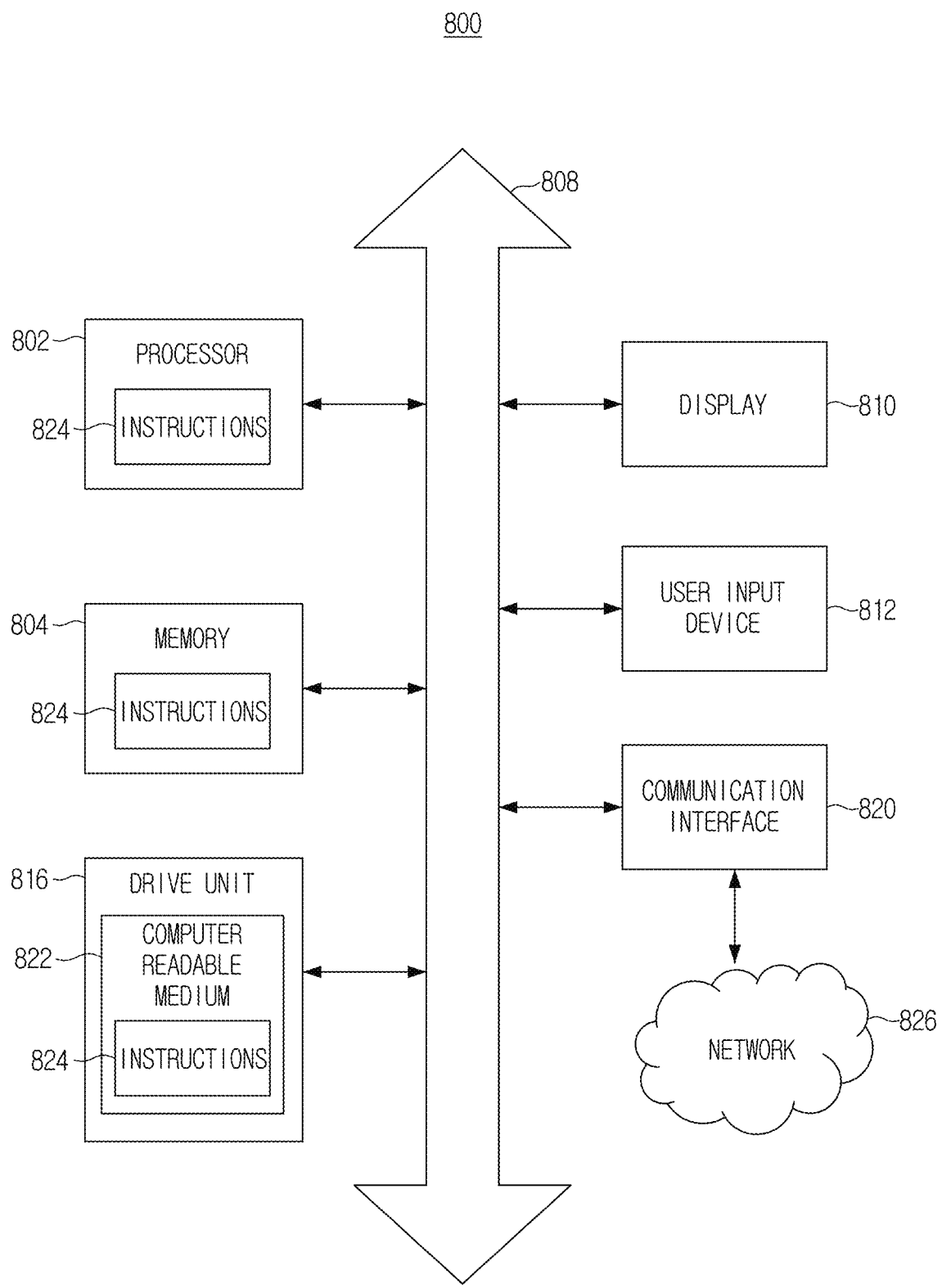
FIG. 11 illustrates an example of computing device for implementing a system architecture according to certain embodiments of this disclosure.

FIG. 11 illustrates an example of hardware configuration suitable for implementing methods according to various embodiments of this disclosure. The computer system 800 may include a set of instructions that may be executed to cause the computer system 800 to perform any one or more of the methods disclosed. The computer system 800 may operate as a standalone device or may be connected, e.g., using a network, to other computer systems or peripheral devices.

In a networked deployment, the computer system 800 may operate in the capacity of a server or as a client user computer in a server-client user network environment, or as a peer computer system in a peer-to-peer (or distributed) network environment. The computer system 800 may also be implemented as or incorporated across various devices, such as a personal computer (PC), a tablet PC, a personal digital assistant (PDA), a mobile device, a palmtop computer, a laptop computer, a desktop computer, a communications device, a wireless telephone, a land-line telephone, a web appliance, a network router, switch or bridge, or any other machine capable of executing a set of instructions (sequential or otherwise) that specify actions to be taken by that machine. Further, while a single computer system 800 is illustrated, the term "system" shall also be taken to include any collection of systems or sub-systems that individually or jointly execute a set, or multiple sets, of instructions to perform one or more computer functions.

The computer system 800 may include a processor 802 e.g., a central processing unit (CPU), a graphics processing unit (GPU), or both. The processor 802 may be a component in a variety of systems. For example, the processor 802 may be part of a standard personal computer or a workstation. The processor 802 may be one or more general processors, digital signal processors, application-specific integrated circuits, field-programmable gate arrays, servers, networks, digital circuits, analog circuits, combinations thereof, or other now known or later developed devices for analysing and processing data. The processor 802 may implement a software program, such as code generated manually (i.e., programmed).

The computer system 800 may include a memory 804, such as a memory 804 that may communicate via a bus 808. The memory 804 may include, but is not limited to computer-readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, memory 804 includes a cache or random access memory for the processor 802. In alternative examples, the memory 804 is separate from the processor 802, such as a cache memory of a processor, the system memory, or other memory. The memory 804 may be an external storage device or database for storing data. The memory 804 is operable to store instructions executable by the processor 802. The functions, acts or tasks illustrated in the figures or described may be performed by the programmed processor 802 for executing the instructions stored in the memory 804. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

As shown, the computer system 800 may or may not further include a display unit 810, such as a liquid crystal display (LCD), an organic light-emitting diode (OLED), a flat panel display, a solid-state display, a cathode ray tube (CRT), a projector, a printer or other now known or later developed display device for outputting determined information. The display 810 may act as an interface for the user to see the functioning of the processor 802, or specifically as an interface with the software stored in the memory 804 or in the drive unit 816.

Additionally, the computer system 800 may include an input device 812 configured to allow a user to interact with any of the components of system 800. The computer system 800 may also include a disk or optical drive unit 816. The disk drive unit 816 may include a computer-readable medium 822 in which one or more sets of instructions 824, e.g. software, may be embedded. Further, the instructions 824 may embody one or more of the methods or logic as described. In a particular example, the instructions 824 may reside completely, or at least partially, within the memory 804 or within the processor 802 during execution by the computer system 800.

Embodiments according to the present disclosure include computer-readable medium that includes instructions 824 or receives and executes instructions 824 responsive to a propagated signal so that a device connected to a network 826 may communicate voice, video, audio, images or any other data over the network 826. Further, the instructions 824 may be transmitted or received over the network 826 via a communication port or interface 820 or using a bus 808. The communication port or interface 820 may be a part of the processor 802 or may be a separate component. The communication port 820 may be created in software or may be a physical connection in hardware. The communication port 820 may be configured to connect with a network 826, external media, the display 810, or any other components in system 800, or combinations thereof. The connection with the network 826 may be a physical connection, such as a wired Ethernet connection or may be established wirelessly as discussed later. Likewise, the additional connections with other components of the system 800 may be physical connections or may be established wirelessly. The network 826 may alternatively be directly connected to the bus 808.

The network 826 may include wired networks, wireless networks, Ethernet AVB networks, or combinations thereof. The wireless network may be a cellular telephone network, an 802.11, 802.16, 802.20, 802.1Q or WiMax network. Further, the network 826 may be a public network, such as the Internet, a private network, such as an intranet, or combinations thereof, and may utilize a variety of networking protocols now available or later developed including, but not limited to TCP/IP based networking protocols. The system is not limited to operation with any particular standards and protocols. For example, standards for Internet and other packet-switched network transmission (e.g., TCP/IP, UDP/IP, HTML, and HTTP) may be used.

While specific language has been used to describe the disclosure, any limitations arising on account of the same are not intended. As would be apparent to a person in the art, various working modifications may be made to the method in order to implement the inventive concept as taught herein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for managing memory for applications in a computing system, said method comprising:
    receiving a selection of a preferred application;
    registering the selected application to a Heavy-app Memory Management unit (HAMM);
    monitoring transitions of the selected application between a foreground and a background during user operation of the computing system; and
    triggering retention of the application in memory based on a transition to background during user operation, wherein retention of the application in memory comprises:
        compressing memory portions of the application;
        retaining the application based on the compressed memory portions;
        sensing a requirement to restore the retained application based on at least one of a user selection or an automatically generated prediction;
        restoring the application back to the foreground based on sensing the requirement to restore the retained application, wherein restoring the application comprises decompressing the compressed portions of the application in the memory to enable occupation of additional space in the memory by the application; and
        allowing the user control over the application,
    wherein receiving of the selection of the preferred application comprises receiving one or more of:
        a selection provided through a user interface; or
        an output of a machine learning (ML) model trained at least in part on a user's application usage behavior,
    wherein triggering retention of the application comprises:
        initiating compression based on using a timeout of the application transitioning into the background, wherein the timeout is at least one of a static timeout or a decaying timeout dynamically determined by the ML mode, and
    wherein the HAMM is based on input features, a context data of the user and computing system, the ML model, a multi-stochastic gradient descent regression and a gradient descent optimizer.

2. The method of claim 1, further comprising:
    receiving a deselection of the application, wherein the deselection indicates that the application is no longer the preferred application; and
    responsive to receiving the deselection, returning the application to from a compressed state to a normal access of the application.

3. The method of claim 1, wherein monitoring transitions of the application comprises monitoring characteristics comprising one or more of memory consumption, or types of content across allocated memory regions.

4. The method of claim 1, wherein compression of the memory portions of the application comprises:
    compressing memory portions of the application in a dedicated data store by a compression method based on characteristics of data of the application in memory; and
    maintaining one or more computing processes supported by the selected application as active to retain the application in the compressed state.

5. The method of claim 1, wherein sensing the requirement to restore the retained application comprises one or more of:
    automatically predicting a likelihood of launch of the retained application; and
    initiating decompression of the retained application at a time prior to a predicted launch.

6. The method of claim 1, wherein storing the compressed portion of the application comprises storing the compressed portion of the application in at least one of a primary memory or a secondary memory based on one or more of primary memory and secondary storage utilization, performance, load and input/output (I/O) operations associated with the computing system.

7. The method of claim 1, wherein triggering retention of the application in memory further comprises:
    determining whether a storage-backed Compressed Data Store (CDS) is available;
    based on the secondary storage-backed CDS being available, performing a check of the storage performance and the storage-backed CDS usage;
    determining whether a cost of compression to the storage-backed CDS is acceptable; and
    based on the cost of the storage-backed CDS being unacceptable, selecting the storage-backed CDS as a compression target.

8. The method of claim 1, wherein an Out of Memory (OOM) score for an application is set to foreground visible and the out of memory (OOM) score adjustment is based on game retention and game relevance, and
    wherein a trend of memory Pressure increase and threshold levels due to compression, retention and eviction of applications is used for updating OOM score.

9. The method of claim 2, wherein returning the application to the normal access comprises:
    releasing the compressed memory and related resources employed during retention of the application.

10. The method of claim 2, wherein receiving the deselection of the application comprises one or more of:
    receiving a manual selection from the user; and
    receiving an automatically generated prediction from a machine learning (ML) module configured to predict a relevance of the application based on a user's usage behavior.

11. The method of claim 2, wherein one or more of retention of the application in the compressed state and deselection of the application is performed based on memory availability.

12. The method of claim 5, wherein automatically predicting the likelihood of a launch of the retained application is performed by a machine learning model based on a user's application usage behavior.

13. The method of claim 12, wherein automatically predicting the likelihood of a launch of the retained application comprises;
learning the machine learning model based on a behavior of the user;
predicting the user's probable application usage behavior and grouping games into relevance-groups; and
determining games in high relevance groups to have a high probability of being launched by the user and determining games in low relevance groups to have a lower probability of being launched by the user.

14. An application memory management system in a computing environment comprising:
a controller; and
an artificial intelligence (AI) module, wherein said controller interacts with the AI module and is configured to:
receive a selection of a preferred application;
register the selected application to a Heavy-app Memory Management unit (HAMM);
monitor transitions of the selected application between a foreground and a background during user operation of the computing environment; and
trigger retention of the application in memory based on a transition to background during said user operation, wherein retention of the application in memory comprises:
compressing memory portions of the application;
retaining the application in a retained state based on the compressed memory portions;
sensing a requirement to restore the retained application based on at least one of a user selection or an automatically generated prediction; and
restoring the application from the retained state back to the foreground based on sensing the requirement to restore the retained application, wherein restoring the application comprises decompressing the compressed portions of the application in the memory to enable occupation of additional space in the memory by the application; and
allowing the user control over the application,
wherein the controller is configured to receive the selection of the preferred application by receiving one or more of:
a selection provided through a user interface; or
an output of a machine learning (ML) model trained at least in part on a user's application usage behavior,
wherein the controller is configured to trigger retention of the application by initiating compression based on using a timeout of the application transitioning into the background, wherein the timeout is at least one of a static timeout or a decaying timeout dynamically determined by the ML model, and
wherein the HAMM is based on input features, a context data of the user and computing system, the ML model, a multi-stochastic gradient descent regression and a gradient descent optimizer.

15. The application memory management system of claim 14, wherein the controller is further configured for:
receiving a deselection of the application, wherein the deselection indicates that the application is no longer the preferred application; and
responsive to receiving the deselection, returning the application from a compressed state to a normal access of the application.

16. The application memory management system of claim 14, wherein monitoring transitions of the application comprises monitoring characteristics comprising one or more of memory consumption, or types of content across allocated memory regions.

17. The application memory management system of claim 14, wherein compression of the memory portions of the application comprises:
compressing memory portions of the application in a dedicated data store by a compression method based on characteristics of data of the application in memory; and
maintaining one or more computing processes supported by the selected application as active to retain the application in the compressed state.

18. The application memory management system of claim 14, wherein the sensing comprises one or more of:
automatically predicting a likelihood of launch of the retained application; and
initiating decompression of the retained application at a time prior to a predicted launch.

19. The application memory management system of claim 14, wherein storing the compressed portion of the application comprises storing the compressed portion of the application in at least one of a primary memory or a secondary memory based on one or more of primary memory and secondary storage utilization, performance, load and input/output (I/O) operations associated with the computing system.

20. The application memory management system of claim 15, wherein the application to the normal access of the application comprises:
releasing compressed memory and related resources employed during retention of the application.

* * * * *